United States Patent [19]

Woodruff

[11] Patent Number: 5,063,753
[45] Date of Patent: Nov. 12, 1991

[54] APPARATUS FOR STORING PRODUCE

[76] Inventor: Richard E. Woodruff, 291, Zabala Rd., Salinas, Calif. 93908

[21] Appl. No.: 435,329

[22] Filed: Nov. 13, 1989

[30] Foreign Application Priority Data

Nov. 11, 1988 [NZ] New Zealand ............... 226929

[51] Int. Cl.[5] ............................................. B60H 1/32
[52] U.S. Cl. ........................................ 62/239; 55/158;
62/78; 62/384; 62/388; 426/418; 426/419
[58] Field of Search ................ 62/78, 384, 388, 239;
426/418, 419; 55/16, 158

[56] References Cited

U.S. PATENT DOCUMENTS

| 3,163,022 | 12/1964 | Hottenroth | 62/388 |
| 4,716,739 | 1/1988 | Harris et al. | 62/78 |
| 4,754,611 | 7/1988 | Hosaka et al. | 62/78 |
| 4,829,774 | 5/1989 | Wassibauer et al. | 62/78 |
| 4,833,892 | 5/1989 | Wassibauer et al. | 62/78 |
| 4,841,732 | 6/1989 | Sarcia | 62/51.1 |
| 4,961,322 | 10/1990 | Oguma et al. | 62/78 |

FOREIGN PATENT DOCUMENTS 3202701 8/1983 Fed. Rep. of Germany .

OTHER PUBLICATIONS

Pamphlet, "Prism–Controlled Atmosphere Systems" by Permea Inc./A. Monsanto Company, St. Louis, Mo. (5 pages).

Primary Examiner—Ronald C. Capossela
Attorney, Agent, or Firm—Fleit, Jacobson, Cohn, Price, Holman & Stern

[57] ABSTRACT

Apparatus for storing produce under controlled conditions embodied in a transport container (5) for maintaining produce under controlled conditions during transportation. Nitrogen-rich gas and carbon dioxide gas are supplied to the container when required by a compact and efficient system wherein the nitrogen gas is generated from the ambient air surrounding the container using an air splitter (35) and the carbon-dioxide is generated from a store of dry-ice (40).

13 Claims, 3 Drawing Sheets

APPARATUS FOR STORING PRODUCE

BACKGROUND OF THE INVENTION

This invention relates to a an apparatus for storing produce. In this context the term produce is intended to refer to, and encompass, harvested vegetable matter of all types, and meat products. It will be appreciated that vegetable matter, after harvesting, continues to respire. While chilled meat and fish do not respire after death it has been found that careful control of the gaseous atmosphere surrounding meat and fish can enhance the quality of both products.

DISCUSSION OF PRIOR ART

It is well known to transport produce such as vegetables, fruit, meat and fish in a modified or artificial atmosphere. Typically the modified atmosphere largely comprises an inert gas, in the form of a nitrogen-rich gas, to keep the oxygen content of the atmosphere in contact with the produce, low. In addition, the carbon dioxide content of the atmosphere is typically monitored and, either increased by the addition of carbon dioxide from gas bottles or, alternatively, reduced by scrubbing carbon dioxide from the atmosphere using, for example, hydrated lime or the like.

In early examples of modified atmosphere storage in transportation, the modified atmosphere within the container was established, after loading, and not further modified during the period of storage or transportation. Early problems were recognized with this in that leakage both into and out of the container changed the atmosphere. Subsequent technologies have provided for monitoring of oxygen and carbon dioxide levels within the container and have provided gas sources to allow modification of the atmosphere during storage and transportation typically allowing nitrogen and carbon dioxide to be added to the container space. However, a further problem has emerged in that the supplies of carbon dioxide and nitrogen gas required to supply the gas requirements of the produce during normal lengths of transportation, are enormously bulky and heavy and it is not economically feasible to provide for the gases to be supplied in this way. Further, even if sufficient gas could be supplied in bottle form, the bottles have to be returned to their source, empty, after the produce has been delivered. This provides further problems.

It has been previously proposed to generate a nitrogen-rich gas on an 'on demand' basis using an air splitter. The SMART system manufactured and marketed by Ted Smith and Company Inc. of Portland, Oreg., United States of America incorporates this technology. However, the SMART system fails to provide for any monitoring or control of carbon dioxide levels within the container space and we have found that it is extremely important to attend to this.

The present invention overcomes the problems inherent in the prior art by not only continuously monitoring and adjusting oxygen and carbon dioxide levels within the container space but also by providing an extremely compact and simple means of supplying both nitrogen-rich gas and carbon dioxide to the container space.

It is an object of the invention to provide an apparatus for storing produce including harvested vegetable matter of all types and meat products.

BRIEF SUMMARY OF THE INVENTION

Accordingly, in one aspect, the invention provides an apparatus for storing produce, and operable by: positioning produce in the interior of a substantially sealable container; substantially sealing the interior of the container from the outside atmosphere; monitoring the oxygen level in said container and, as required, generating a nitrogen-rich gas from the ambient air surrounding the container and directing the nitrogen-rich gas into the container until a predetermined oxygen level is established or re-established; monitoring the carbon dioxide level within said container and, as required, directing into the interior thereof carbon dioxide derived from a store of dry-ice associated with the container, so that a predetermined level of carbon dioxide is established or re-established therein.

The nitrogen-rich gas is preferably generated using an air splitter of a type which incorporates membranes to divide a stream of ambient air, under pressure, into its principal constituents of oxygen and nitrogen. The same splitter is preferably actuated in the event the carbon dioxide level within the container rises above a predetermined maximum. The resulting gas stream dilutes the excess carbon dioxide with further nitrogen-rich gas.

The invention provides an apparatus for carring out the above operation which comprises: a substantially sealable container; first monitoring means operable to monitor the level of oxygen within the container; first operative means responsive to the first monitoring means, the first operative means being constructed and arranged to generate a nitrogen-rich gas from the ambient air surrounding the container and direct the gas into the container in response to the first monitoring means monitoring an oxygen level other than at a predetermined level; second monitoring means operable to monitor the carbon dioxide level within the container; dry-ice storage means; and second operative means operable to direct carbon dioxide from the dry-ice storage means into the container in response to the second monitoring means monitoring a carbon dioxide level beneath a predetermined level.

The sealable container as used herein preferably comprises a transport container and, more preferably, a container of the ISO type.

The first monitoring means preferably comprises an oxygen level monitor and the second monitoring means preferably comprises a carbon dioxide level monitor.

The first operative means preferably comprises an air splitter of the membrane type which splits ambient air, under pressure, into its principal constituents of nitrogen and oxygen. A compressor is provided to pump ambient air through the air splitter. This compressor is preferably of the oilless type to prevent oil damage to the splitter membranes.

The dry-ice storage means preferably comprises an insulated box which may be mounted either inside or outside the container. Valve means are associated with the insulated box to control the flow of carbon dioxide generated from the decomposing dry-ice into the container. The valve means preferably comprises a multi-position valve which, in one of its positions directs carbon dioxide from decomposed dry-ice outside of the container. As an alternative the decomposing dry-ice may be vented to the atmosphere surrounding the container through a pressure relief valve provided on the storage box.

Where a multi-position valve is incorporated, a solenoid switch is preferably provided to move the valve member between its alternative positions. This solenoid switch is operated from the carbon dioxide level monitor.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

DESCRIPTION OF THE PREFERRED EMBODIMENT

Figure 1:
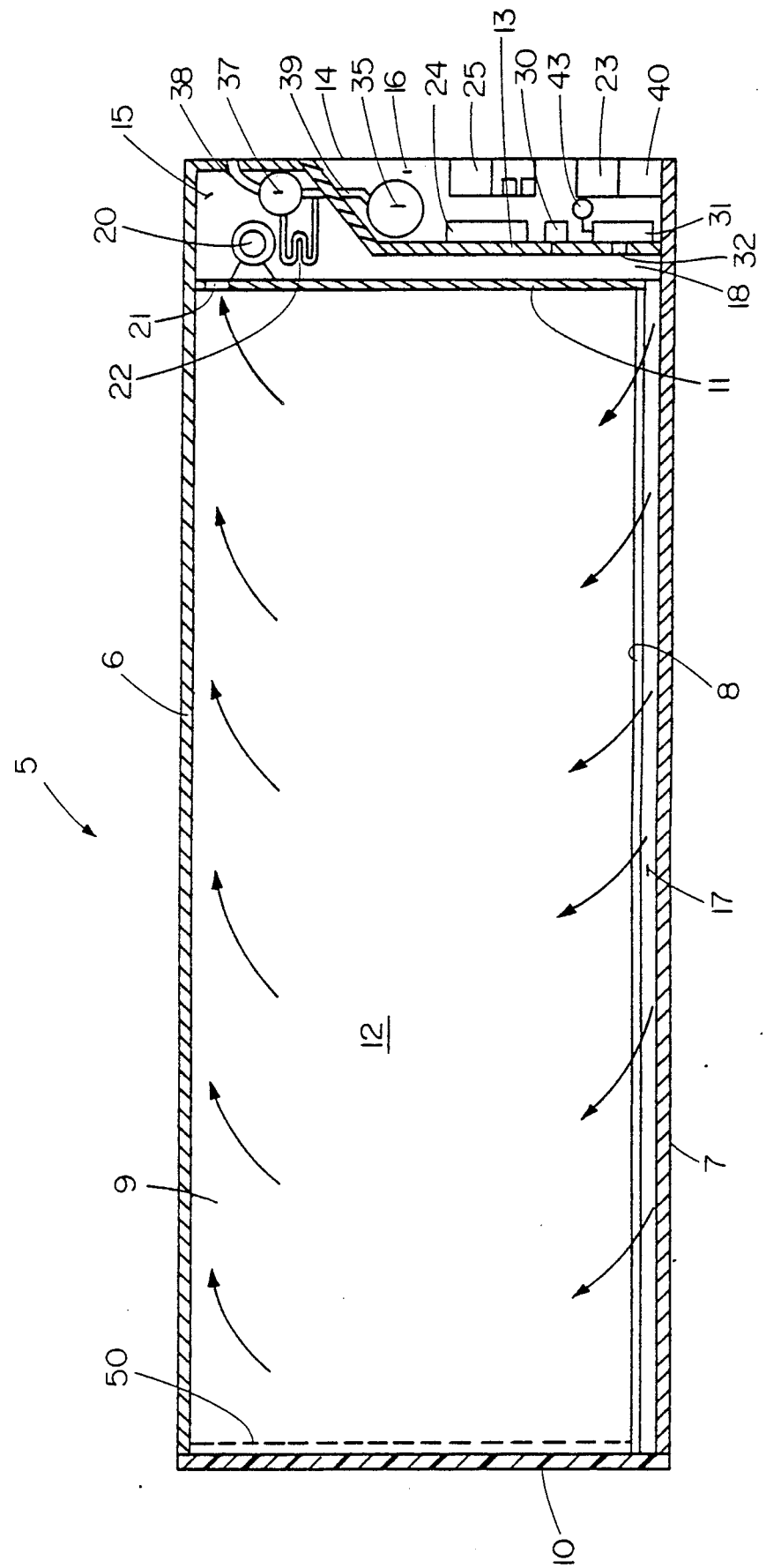
FIG. 1 is a partially schematic longitudinal cross-sectional view through a transport container incorporating the invention.

The invention provides an apparatus for storing produce or comestibles such as fruit, vegetables, meat and fish. The principles of the invention are preferably applied to transport containers and, more particularly, to transport containers of the ISO type, so that the beneficial storage conditions can be applied to the produce while being transported from their source to their desired place of distribution and/or marketing.

In accordance with the invention the levels of oxygen and carbon dioxide within the storage container are positively maintained at desired predetermined levels. The actual predetermined levels of carbon dioxide and oxygen selected will vary according to the nature of the produce. These levels are generally well known or can be established by simple experimentation.

Referring now to the figures a container 5 is shown having a roof 6, a base 7, an internal load support floor 8, side walls 9 and rear doors 10. A first bulkhead 11 defines the front boundary of the load space 12. A second bulkhead 13 is provided which defines, in part, the front plane 14 of the container 5. The bulkhead 13 further defines an enclosed space 15 in combination with the bulkhead 11, and a recess 16 which is open to the front of the container.

The load support surface 8 is of a type known in the art in that it is configured to provide gas delivery channels 17 beneath the support surface, the channels 17 being fed from a supply duct 18 defined between the bulkhead 13 and the bulkhead 11. Gases delivered through the duct 18 pass along the channels 17 and thus into contact with the load occupying the load space 12. The direction of circulation of the gases is shown simplistically by the arrows in FIG. 1.

Located within the enclosed space 15 at the front of the container is an air blower or fan 20. This fan draws air from the load space 12 through a port 21 in the bulkhead 11, directs the air flow over evaporator coil 22 and then directs the cooled air stream down into the delivery duct 18 for return to the load space 12. The evaporator coil 22 forms part of a refrigeration system which further includes compressor 23 and refrigeration compressor coil 24 which are located in recess 16, externally of the container so as to be in contact with ambient air. The parameters of the refrigeration system are set at, and may be displayed on, control panel 25.

Also located within the recess 16 are an oxygen level monitor 30 and a carbon dioxide level monitor 31. Both of these instruments communicate through bulkhead 11 with gases flowing through supply duct 18 to sense the oxygen and carbon dioxide levels in the gas being returned to the load space 12. $CO_2$ level monitor 31 communicates with supply duct 18 by conduit 32 shown in FIG. 1, for example. The oxygen monitor and carbon dioxide monitor may comprise TAI Model 335-X and TAI Model 731-X respectively manufactured by Teledyne Analytical Instruments of California, United States of America. In accordance with the invention these analyzers or monitors 30 and 31 are operatively connected to supplies of nitrogen-rich gas and carbon dioxide so that the levels of oxygen and carbon dioxide within the load space 12 can be monitored constantly and adjusted on an "on demand" basis.

The oxygen level within the container is adjusted by directing a nitrogen-rich gas into the container. The nitrogen-rich gas, itself, includes a small, but adjustable, percentage of oxygen. The nitrogen rich gas is generated from ambient air surrounding the container by an air splitter 35 which, as can be seen, is located in recess 16 at the front of the container 5. The particular form of air splitter described herein is a device which employs selective permeation to separate nitrogen and oxygen from ambient air. Ambient air is forced, under pressure, through bundles of semi-permeable membranes formed into tiny hollow fibers. Because of the different rates of permeation, the oxygen flows through the fiber walls and can exhausted through slow gas outlet 42, for example, while the nitrogen passes longitudinally of the hollow fibers. We have found that an air splitter manufactured by Permea Inc. of St Louis, Mo., United States of America is particularly suitable for the purposes of this invention.

In the form shown the air splitter 35 is supplied with ambient air under pressure by compressor 37. The compressor 37 is of the oiless type and, in the form shown, is located within enclosed space 15. The compressor 37 is operated from the oxygen level monitor 30 and draws ambient air from outside the container through inlet pipe 38 and delivers compressed air to the splitter 35 through delivery pipe 39. Both pipes 38 and 39 pass through the bulkhead 13.

Figure 2:
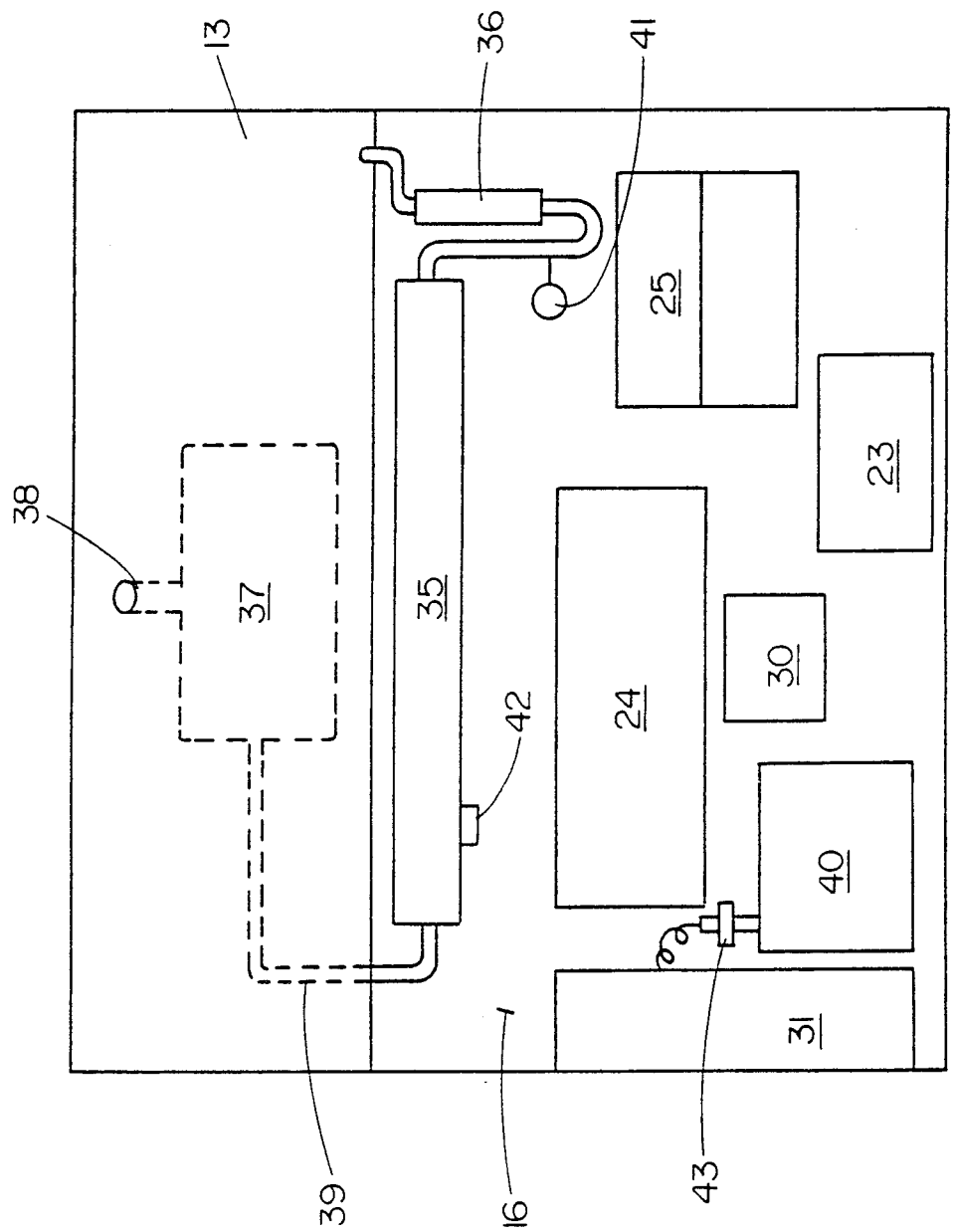
FIG. 2 shows an enlarged schematic front elevational view of the container shown in FIG. 1.
Figure 3:
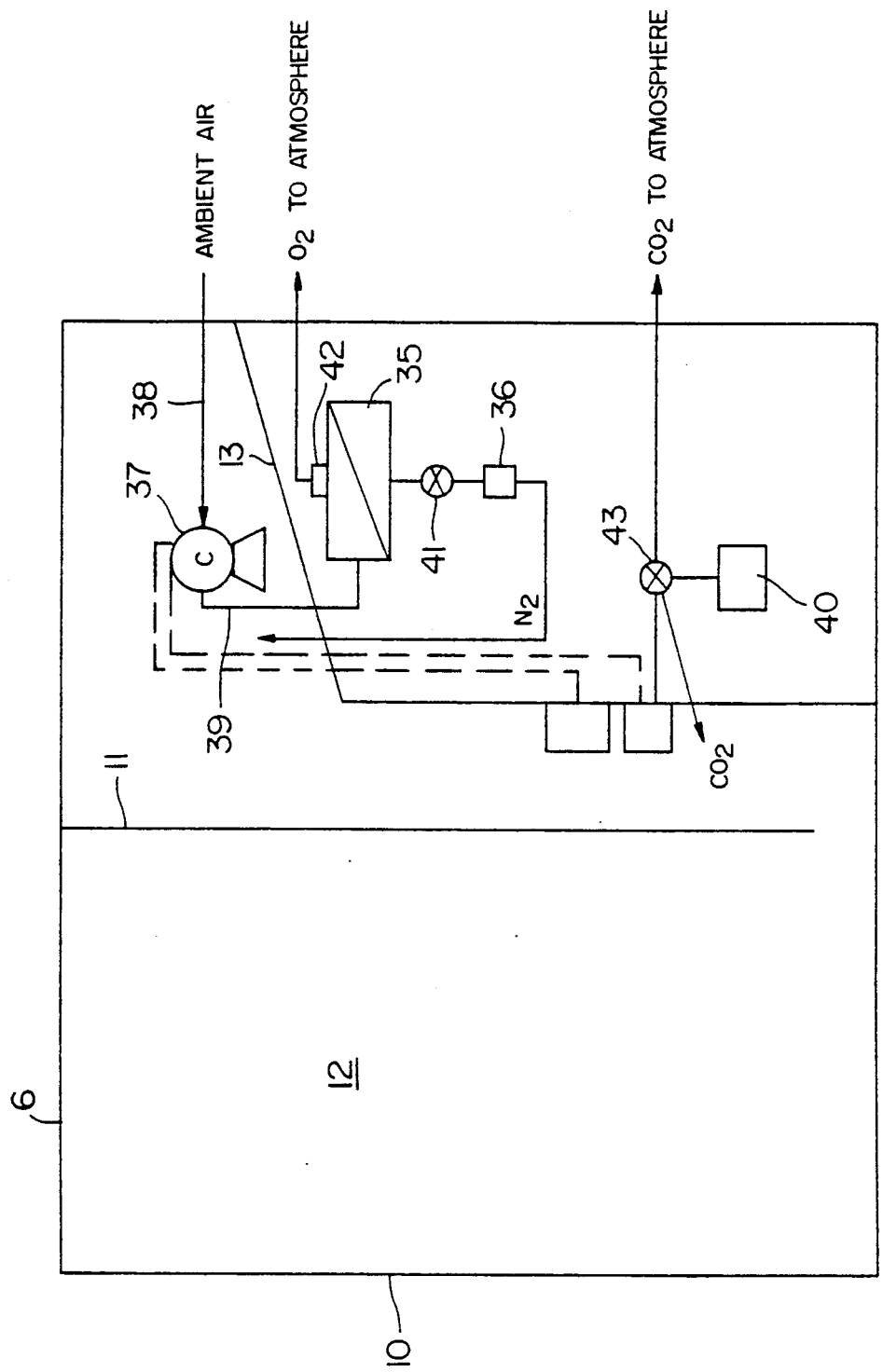
FIG. 3 is a schematic circuit diagram of the system of the invention as shown in FIG. 1.

As can be seen from FIG. 2 a flow meter 36 is provided on the delivery side of the air splitter 35. An adjustable valve 41, which is typically a needle valve, is provided in conjunction with the flow meter to alter the flow characteristics through the air splitter 35. A consequence of this is that the rate of permeation, and thus the oxygen content of the nitrogen-rich gas stream, may be varied. Typically the oxygen content of the nitrogen-rich gas may be varied between substantially 0% and 21%. This range covers the oxygen requirements for most produce applications.

The compressor 37 may also be operatively connected to the carbon dioxide level monitor 31 in a manner such that if the carbon dioxide level rises above a predetermined maximum, nitrogen-rich gas is directed into the container to dilute the carbon dixoide content.

The compressor 37 is preferably located within refrigerated space 15 for a number of reasons. Firstly, the cool air within the space 15 helps to cool the compressor. Further, by locating the compressor within the container it is protected from corrosive elements often present in the ambient air.

The carbon dioxide sensor or monitor 31 is operatively connected to a source of carbon dioxide which, according to the invention, is supplied in the form of dry ice. The dry ice is contained within an insulated box 40 which, in the form shown, is mounted within recess 16 at the front of the container. However, the insulated box 40 could also be mounted within the refrigerated space to further enhance the insulative properties of the box.

The box 40, wherever mounted, includes thick insulated walls so as to insulate the dry ice. We have found that using suitable insulation a 50 pound block of dry ice (1 cubic foot) provides a source of carbon dioxide gas for approximately 12 days. In order to achieve this a two inch layer of polystyrene insulation (not shown) is provided about the dry ice within the box 40.

It will be appreciated that the box 40 might include its own refrigerating system to control the rate of decay of dry-ice into gaseous carbon dioxide. This refrigerating system could be part of the main refrigeration system powered by compressor 23. While cooling the box 40, or its contents, would obviously reduce the rate of decay of dry-ice, it is also preferred that when the carbon-dioxide level within the load space 12 falls below the predetermined minimum, the desired level is re-established in the shortest possible time. To this end, some form of heating device could be incorporated into the box 40 to allow the decay process to be temporarily speeded up.

It will also be appreciated that more than one dry-ice storage box could be provided for applications where carbon dioxide supply was required over a greater period of time. In this event it is almost certain that at least one of these boxes would be refrigerated to prevent decay of the dry-ice contents until required.

Multi-position valve means 43 are preferably provided to control the flow of carbon dioxide derived from the decomposing dry ice. As can be seen the valve 43 is operatively connected to the carbon dioxide level monitor 31 and is arranged, so that, in a first position, carbon dioxide is directed into the container space upon the monitor 31 sensing a carbon dioxide level below the predetermined minimum. In a further position the valve allows carbon dioxide to bleed off into the ambient air surrounding the container. As an alternative to the multi-position valve the supply to the container space could be of the 'on/off' type and a pressure relief valve provided on, or in communication with, the insulated box 40 to avoid the build-up of excess pressure within the box 40 through the decomposition of the dry ice into carbon dioxide gas.

It will be appreciated that transport containers of the ISO type are not completely sealable. Further, as the containers are used, they develop leaks. Experience has shown that the greatest leakage occurs through the doors 10 defining the rear of the container. As with other forms of controlled atmosphere storage containers the present invention seeks to reduce this leakage through the rear doors by the provision of a sealing curtain 50 mounted between the load within the load space 12 and the inside of the doors 10.

In use produce is placed within the storage area 12 and the sealing curtain 50 located in position. The doors 10 are then closed. In order to establish the atmosphere within the storage area level the predetermined oxygen and carbon dioxide control levels are set by operation of external controllers on display panel 25. The compressor 37 then operates to direct ambient air through the air splitter 35 whereupon the nitrogen-rich gas stream is directed into the container to fill the load space with a nitrogen-rich gas containing the exact predetermined quantity of oxygen. The oxygen rich gas stream is directed back to atmosphere. At the same time the carbon dioxide monitor 31 operates and, in turn, brings the carbon dioxide level within the storage area 12 up to the predetermined level by directing carbon dioxide obtained from the degradation of the dry ice block within box 40 into the interior of the container. The gases within the container space are circulated by blower 20 and may be subjected to heating or cooling by use of the refrigeration system.

Owing to leakage within the container and also to respiratory activity of the produce the environment within space 12 will continually change. This is continuously monitored and, bought back to the predetermined levels by appropriate operation of the splitter 35, and of the control valve 43.

If necessary the container as herein described can include further means to monitor and, if necessary, modify ethylene and carbon monoxide levels within the container space 12.

It will thus be appreciated that the present invention provides a relatively simple yet effective means of positively controlling the atmosphere within a storage container and re-establishing the atmosphere on an "on demand" basis.

What is claimed is:

1. Apparatus for storing produce comprising:
   a substantially sealable container having a hollow interior for containing the produce;
   nitrogen rich gas generating means having an inlet means communicating with ambient air surrounding said container and a delivery means communicating with said hollow interior so that said gas generating means generates nitrogen rich gas from the ambient air and delivers said nitrogen rich gas to said hollow interior;
   oxygen level adjusting means in said delivery means for varying the oxygen content of said nitrogen rich gas delivered to said hollow interior;
   first monitoring means operatively connected to said container and said nitrogen rich gas generating means for detecting the oxygen level within said container and controlling the operation of said nitrogen rich gas generating means when said oxygen level is other than a predetermined level;
   dry-ice storage means;
   carbon dioxide gas control means connected to said dry-ice storage means and said hollow interior for delivering carbon dioxide gas from said dry-ice storage means to said hollow interior; and
   second monitoring means connected to said container and said carbon dioxide gas control means for detecting carbon dioxide gas level in said container and operating said carbon dioxide gas control means when said carbon dioxide gas level is below a predetermined level.

2. Apparatus as claimed in claim 1 wherein said dry-ice storage means comprises an insulated box.

3. Apparatus as claimed in claim 2 wherein said carbon dioxide gas control means comprises valve means for controlling the flow of carbon dioxide gas generated from decomposing dry-ice into said hollow interior.

4. Apparatus as claimed in claim 3 wherein said valve means comprises a multi-position valve having a position wherein carbon dioxide gas from decomposing dry-ice is directed outside of said container when not being directed into said hollow interior.

5. Apparatus as claimed in claim 3 and further comprising a pressure relief valve for venting carbon dioxide gas from decomposing dry-ice from said insulated box to the atmosphere surrounding said container.

6. Apparatus as claimed in claim 1 wherein said container comprises a transport container.

7. Apparatus as claimed in claim 6 wherein said transport container is of the ISO type.

8. Apparatus as claimed in claim 1 wherein said nitrogen rich gas generating means comprises:
   an air splitter of the membrane type which splits ambient air, under pressure, into its principal constituents of nitrogen and oxygen; and
   a compressor in said inlet means for pumping ambient air through said air splitter.

9. Apparatus as claimed in claim 8 wherein:
   said container comprises a refrigerated space separated from said hollow interior and from the ambient air surrounding said container;
   said compressor is mounted in said refrigerated space; and
   refrigeration means are provided for refrigerating said refrigerator space.

10. Apparatus as claimed in claim 9 wherein said dry-ice storage means comprises an insulated box.

11. Apparatus as claimed in claim 10 wherein said carbon dioxide gas control means comprises valve means for controlling the flow of carbon dioxide gas generated from decomposing dry-ice into said hollow interior.

12. Apparatus as claimed in claim 11 wherein said valve means comprises a multi-position valve having a position wherein carbon dioxide gas from decomposing dry-ice is directed outside of said container when not being directed into said hollow interior.

13. Apparatus as claimed in claim 11 and further comprising a pressure relief valve for venting carbon dioxide gas from decomposing dry-ice from said insulated box to the atmosphere surrounding said container.

* * * * *